United States Patent
Warkentin et al.

(10) Patent No.: US 12,253,956 B2
(45) Date of Patent: Mar. 18, 2025

(54) HYBRID SCHEME FOR PERFORMING TRANSLATION LOOKASIDE BUFFER (TLB) SHOOTDOWNS

(71) Applicant: VMware LLC, Palo Alto, CA (US)

(72) Inventors: Andrei Warkentin, South Elgin, IL (US); Jared McNeill, Quispamsis (CA); Grant Foudree, Mountain View, CA (US); Anil Veliyankaramadam, San Ramon, CA (US)

(73) Assignee: VMWare LLC, Palo Alto, CA (US)

( * ) Notice: Subject to any disclaimer, the term of this patent is extended or adjusted under 35 U.S.C. 154(b) by 205 days.

(21) Appl. No.: 18/053,103

(22) Filed: Nov. 7, 2022

(65) Prior Publication Data

US 2024/0152465 A1    May 9, 2024

(51) Int. Cl.
*G06F 12/10*     (2016.01)
*G06F 12/1045*    (2016.01)

(52) U.S. Cl.
CPC ...... *G06F 12/1045* (2013.01); *G06F 2212/68* (2013.01)

(58) Field of Classification Search
CPC ... G06F 12/1045; G06F 12/10; G06F 2212/68
See application file for complete search history.

(56) References Cited

U.S. PATENT DOCUMENTS

| | | | | |
|---|---|---|---|---|
| 8,327,187 B1 * | 12/2012 | Metcalf | | G06F 9/544 714/10 |
| 2014/0115297 A1 * | 4/2014 | Cain, III | | G06F 12/1027 711/207 |
| 2014/0189285 A1 * | 7/2014 | Conrad | | G06F 12/1027 711/207 |
| 2017/0286300 A1 * | 10/2017 | Doshi | | G06F 12/1009 |
| 2019/0042671 A1 * | 2/2019 | Caspi | | G06F 30/3323 |
| 2019/0163644 A1 * | 5/2019 | Jayasena | | G06F 12/1009 |
| 2019/0377688 A1 * | 12/2019 | Basu | | G06F 9/542 |

(Continued)

FOREIGN PATENT DOCUMENTS

| WO | WO-2017172300 A1 * | 10/2017 | ......... G06F 12/0831 |
|---|---|---|---|
| WO | WO-2020005444 A1 * | 1/2020 | ......... G06F 12/0813 |

OTHER PUBLICATIONS

A. Awad, A. Basu, S. Blagodurov, Y. Solihin and G. H. Loh, "Avoiding TLB Shootdowns Through Self-Invalidating TLB Entries," 2017 26th International Conference on Parallel Architectures and Compilation Techniques (PACT), Portland, OR, USA, 2017, pp. 273-287.*

(Continued)

*Primary Examiner* — Pierre Michel Bataille
(74) *Attorney, Agent, or Firm* — Quarles & Brady LLP

(57) ABSTRACT

A hybrid scheme is provided for performing translation lookaside buffer (TLB) shootdowns in a computer system whose processing cores support both inter-processor interrupt (IPI) and broadcast TLB invalidate (TLBI) shootdown mechanisms. In one set of embodiments, this hybrid scheme dynamically determines, for each instance where a TLB shootdown is needed, whether to use the IPI mechanism or the broadcast TLBI mechanism to optimize shootdown performance (or otherwise make the TLB shootdown operation functional/practical).

21 Claims, 5 Drawing Sheets

(56) References Cited

U.S. PATENT DOCUMENTS

2022/0083468 A1\* 3/2022 Wei ..................... G06F 12/084
2022/0083476 A1\* 3/2022 Wei ..................... G06F 12/0842

OTHER PUBLICATIONS

C. Villavieja et al., "DiDi: Mitigating the Performance Impact of TLB Shootdowns Using a Shared TLB Directory," 2011 International Conference on Parallel Architectures and Compilation Techniques, Galveston, TX, USA, 2011, pp. 340-349.\*

B. Pham, D. Hower, A. Bhattacharjee and T. Cain, "TLB Shootdown Mitigation for Low-Power Many-Core Servers with L1 Virtual Caches," in IEEE Computer Architecture Letters, vol. 17, No. 1, pp. 17-20, Jan. 1-Jun. 2018.\*

Moon-Seek Chang and Kern Koh, "Lazy TLB consistency for large-scale multiprocessors," Proceedings of IEEE International Symposium on Parallel Algorithms Architecture Synthesis, Aizu-Wakamatsu, Japan, 1997, pp. 308-315.\*

\* cited by examiner

HYBRID SCHEME FOR PERFORMING TRANSLATION LOOKASIDE BUFFER (TLB) SHOOTDOWNS

BACKGROUND

Unless specifically indicated herein, the approaches described in this section should not be construed as prior art to the claims of the present application and are not admitted to be prior art by inclusion in this section.

A translation lookaside buffer (TLB) is a cache that stores virtual-to-physical memory address mappings, known as page table entries (PTEs), that have been recently accessed by a central processing unit (CPU) of a computer system. By retrieving PTEs from the TLB rather than from page tables residing in main memory, the CPU can accelerate virtual memory operations.

In a symmetric multiprocessing (SMP) computer system comprising multiple CPUs (referred to herein as processing cores or simply cores), each processing core has its own TLB. As a result, PTEs that are associated with a virtual memory address range shared by more than one processing core must be synchronized (or in other words, made coherent) across the TLBs of those cores in order to ensure security and correctness. This coherence is achieved via an operating system (OS) orchestrated operation known as a TLB shootdown that flushes one or more PTEs from the TLBs of a specified set of target processing cores.

On SMP computer systems with processing cores that implement an x86 CPU architecture, TLB shootdowns are performed using an inter-processor interrupt (IPI) mechanism. IPI-based TLB shootdowns are functional but costly from a performance perspective because they interrupt the work being executed on the target processing cores and can take several thousand CPU cycles to complete.

On SMP computer systems with processing cores that implement a 64-bit ARM CPU architecture, TLB shootdowns can be performed using the same IPI mechanism as x86-based systems, as well as via an alternative mechanism that leverages a hardware instruction known as broadcast TLB invalidate (TLBI). With this broadcast TLBI mechanism, TLB shootdown performance is improved over the IPI mechanism because there is no interruption of work on the target processing cores; instead, the TLB shootdown operation is handled at each target core in CPU hardware. However, the broadcast TLBI mechanism suffers from other limitations that make it suboptimal or impractical to use in certain scenarios.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to a hybrid scheme for performing TLB shootdowns in an SMP computer system whose processing cores support both IPI and broadcast TLBI shootdown mechanisms (e.g., a 64-bit ARM-based SMP system). In one set of embodiments, this hybrid scheme dynamically determines, for each instance where a TLB shootdown is needed, whether to use the IPI mechanism or the broadcast TLBI mechanism in order to optimize shootdown performance (or otherwise make the TLB shootdown operation functional/practical).

1. Example Computer System and Solution Overview

Figure 1:
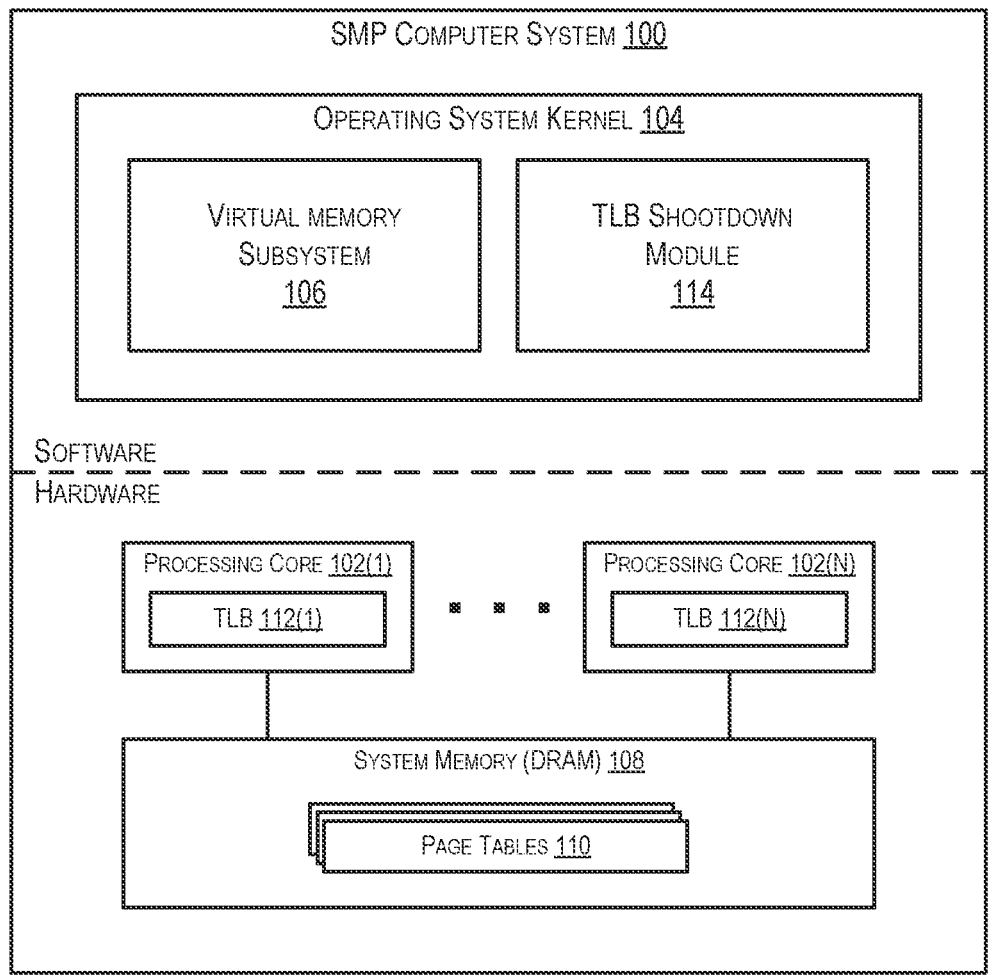
FIG. 1 depicts an example computer system.

To provide context for the embodiments described herein, FIG. 1 is a simplified block diagram of an example SMP computer system 100 that includes a plurality of processing cores 102(1)-(N) and an OS kernel 104 that implements virtual memory via a virtual memory subsystem 106. As known in the art, virtual memory is a memory management paradigm that involves presenting separate logical (i.e., virtual) memory address spaces to software processes, where each virtual memory address space is an abstraction of the physical memory address space of system (i.e., main) memory. At the time a process submits a request to read or write a virtual memory address, the virtual memory address is translated, via a combination of software and hardware, into a corresponding physical memory address. The physical memory address is then accessed in system memory to fulfill the read/write request.

As shown in FIG. 1, each processing core 102 of computer system 100 is attached to a shared system memory (e.g., DRAM) 108, which stores a set of page tables 110 that hold the virtual-to-physical memory address mappings (i.e., page table entries (PTEs)) managed by virtual memory subsystem 106 of OS kernel 104. In addition, each processing core 102 includes a TLB 112 which caches PTEs that have been recently accessed by that processing core from pages tables 110 and thus allows for fast virtual-to-physical address translations. For example, assume a process running on processing core 102(1) submits a request to read the contents of a virtual memory address A1. In this scenario, if processing core 102(1) can find a PTE for virtual memory address A1 in its TLB 112(1) (known as a TLB hit), processing core 102(1) can immediately retrieve the corresponding physical memory address from TLB 112(1) and proceed with completing the read. In contrast, if processing core 102(1) cannot find a PTE for virtual memory address A1 in TLB 112(1) (known as a TLB miss), processing core 102(1) must perform a traversal (i.e., page walk) through page tables 110 in system memory 108 to determine the physical memory address mapped to A1, which is a time consuming task.

For TLB caching to work as intended, it is important that the PTEs cached in TLBs 112(1)-(N) are kept coherent/synchronized with the state of those PTEs in page tables 110. If this coherency is not maintained, a process may access a stale (i.e., no longer valid) PTE via a TLB, resulting in correctness and/or security issues. There are several events/operations that can change or invalidate PTEs in page tables 110 and thus cause the cached versions of those PTEs in TLBs 112(1)-(N) to become stale, such as memory deduplication, reclamation, huge page compaction, and NUMA (non-uniform memory access) memory migration. In addition, user applications may modify/invalidate PTEs in page tables 110 by invoking certain OS system calls and by writing to copy-on-write (CoW) memory pages.

In the case where one or more PTEs cached in a single TLB become stale, an OS kernel process running on the TLB's processing core can perform a TLB flush, which removes/invalidates some or all of the PTEs in that TLB (and thus will cause the processing core to retrieve the flushed PTEs from page tables 110 in response to future memory requests). However, in the case where one or more PTEs cached in multiple TLBs become stale (which may occur if the same virtual memory address space is shared across multiple processing cores), the OS kernel must do more than simply flush a single TLB. This is because existing CPU architectures generally do not provide hardware TLB coherence and therefore will not automatically propagate a TLB flush from one TLB to another.

To address this issue, OS kernel 104 of computer system 100 includes a TLB shootdown module 114 that allows the OS kernel to orchestrate a synchronization operation known as TLB shootdown. Through this operation, at the time an OS kernel process running on a first (i.e., initiator) processing core determines that one or more PTEs in a virtual address space have become stale and need to be flushed from its TLB, the kernel process can instruct other (i.e., target) processing cores that are sharing that virtual address space to also flush those same PTEs from their respective TLBs (or alternatively perform a global flush of all PTEs from their respective TLBs). In this way, OS kernel 104 can ensure that all TLBs 112(1)-(N) in computer system 100 remain consistent with each other.

Figure 2:
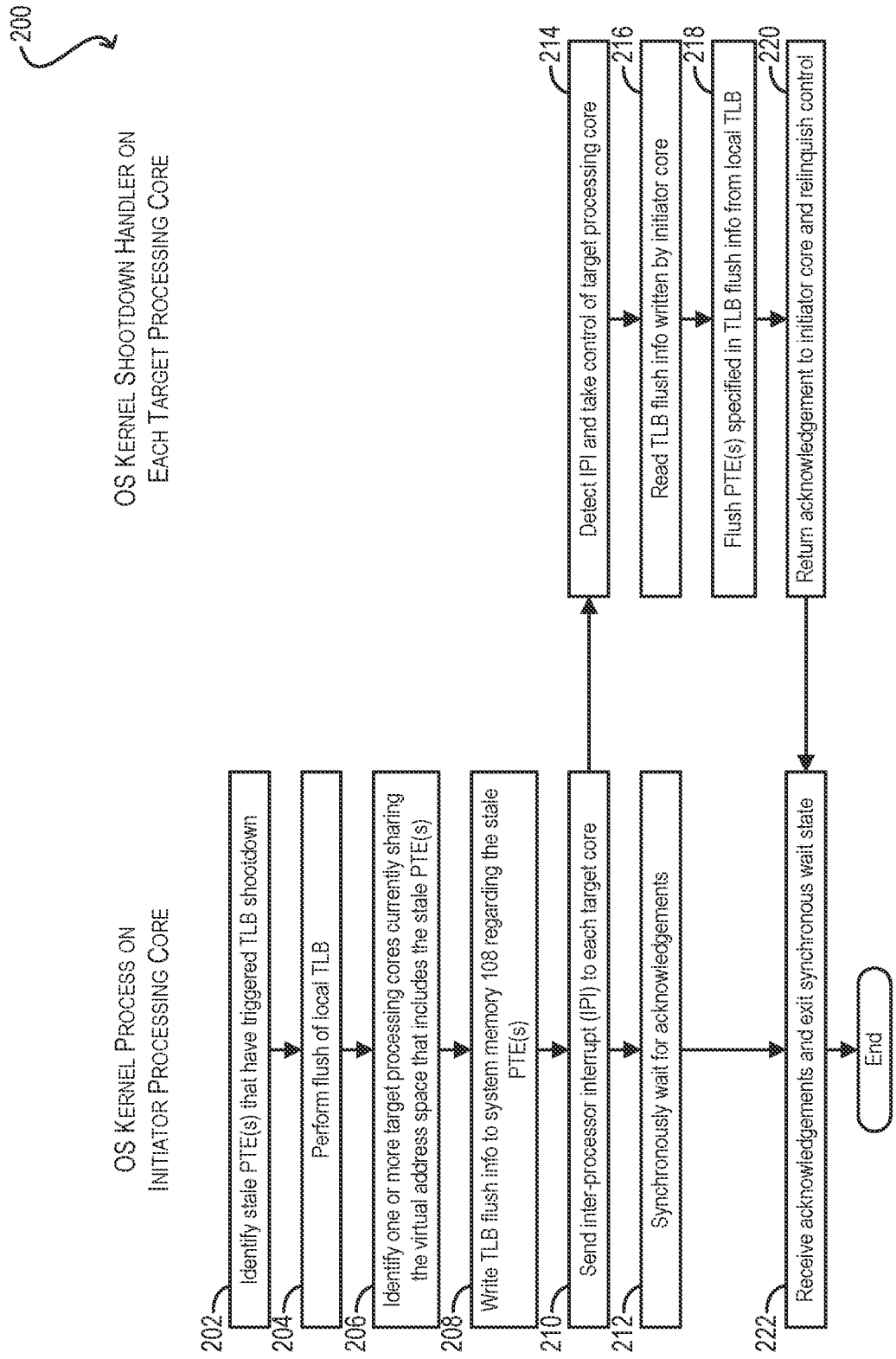
FIG. 2 depicts an IPI-based TLB shootdown workflow.
Figure 3:
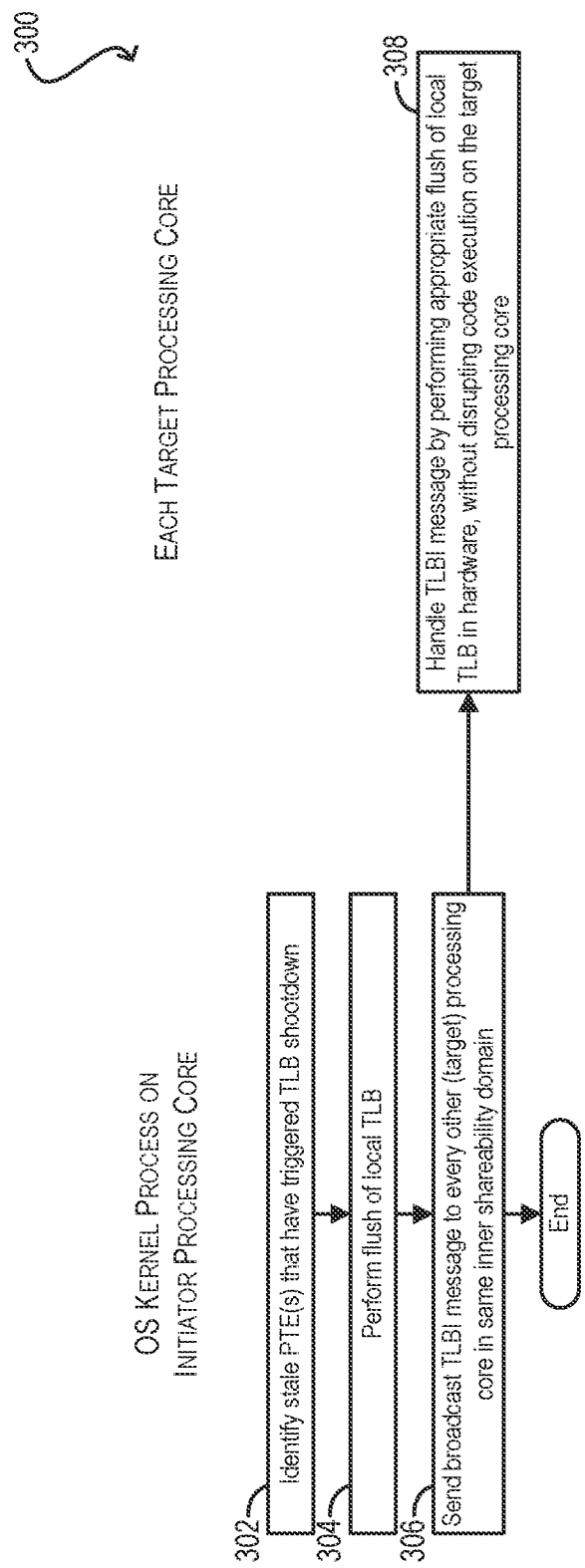
FIG. 3 depicts a broadcast TLBI-based TLB shootdown workflow.

As mentioned in the Background section, on 64-bit ARM-based SMP systems, the OS kernel can perform TLB shootdowns using one of two mechanisms: an inter-processor interrupt (IPI) mechanism or a broadcast TLB invalidate (TLBI) mechanism. To clarify how these two mechanisms work, FIG. 2 depicts a high-level workflow 200 of a typical IPI-based TLB shootdown and FIG. 3 depicts a high-level workflow 300 of a typical broadcast TLBI-based TLB shootdown.

Starting with steps 202 and 204 of workflow 200, an OS kernel process running on an initiator processing core (i.e., initiator core process) identifies one or more stale PTEs that have triggered the current TLB shootdown and performs a TLB flush to remove those stale PTEs from the TLB of the initiator processing core. Depending on the number of stale PTEs, the initiator core process may either (1) flush only those PTEs, (2) flush all PTEs in the virtual address space in which the stale PTEs reside, or (3) flush the entirety of the TLB.

At step 206, the initiator core process identifies one or more target processing cores that are currently sharing (i.e., accessing) the virtual address space of the stale PTEs identified at step 202. The initiator core process then writes TLB flush information into system memory 108 regarding the PTEs to be flushed from the TLBs of the target processing cores (step 208), sends an inter-processor interrupt (IPI) to each identified target core (thereby invoking an OS kernel shootdown handler at that core) (step 210), and synchronously waits for acknowledgements (step 212).

At each target processing core, upon detecting the IPI, the shootdown handler takes control of the target core (step 214), reads from system memory 108 the TLB flush information written by the initiator core process (step 216), and flushes PTEs from the local TLB of the target core in accordance with that information (step 218). The shootdown handler subsequently returns an acknowledgement to the initiator core process indicating that its local TLB flush has been completed and relinquishes control over the target processing core (thereby allowing other code to run) (block 220).

Finally, at step 222, the initiator core process receives the acknowledgements from the shootdown handlers of the target processing cores and exits out of its synchronous wait state. At the conclusion of this step, the TLB shootdown is deemed complete and the workflow ends.

Turning now to workflow 300 (i.e., the broadcast TLBI-based shootdown), at steps 302 and 304, the initiator core process identifies one or more stale PTEs that have triggered the current TLB shootdown and performs a TLB flush to remove those PTEs from the TLB of the initiator processing core. These steps are substantially similar to steps 202 and 204 of workflow 200.

At step 306, the initiator core process sends a broadcast TLBI message to every other processing core in the same inner shareability domain as the initiator processing core (i.e., the target processing cores), with one or more parameters specifying a virtual address to be flushed from the target core's TLB or indicating that the entirety of the target core's TLB should be flushed (i.e., a global flush). The notion of an inner shareability domain is explained in section (3) below. The initiator core process then terminates its processing, without waiting for an acknowledgement from the target processing cores.

At step 308, in response to receiving the broadcast TLBI message, each target processing core handles the message in hardware, without requiring the intervention of an OS kernel shootdown handler and thus without disrupting the code currently running on the target core. For example, if the message indicates that a particular virtual address should be flushed from the target processing core's TLB, the flush of that virtual address is performed automatically via the target core's hardware. Similarly, if the message indicates that all PTEs should be flushed from the target processing core's TLB, that global flush is performed automatically via the target core's hardware. As noted above, the initiator core process does not synchronously wait for these flushes to be confirmed; it simply assumes that they will be completed at some future point in time. Accordingly, workflow 300 ends after steps 306 and 308.

Although the IPI mechanism used in workflow 200 will achieve correct TLB coherence in all scenarios, it is also costly for at least two reasons. First, the OS kernel shootdown handler at each target processing core must interrupt the work being performed at that core in order to carry out its shootdown processing. Second, the initiator processing core must synchronously wait for acknowledgements from the target processing cores before it can conclude that the shootdown is complete and continue with its processing, which may take several thousands of CPU cycles.

In contrast, the broadcast TLBI mechanism used in workflow 300 does not suffer from the same performance problems as the IPI mechanism because there is no need to run a shootdown handler at each target processing core (thereby avoiding the disruption of in-progress work at that core) and there is no need for the initiator core to synchronously wait on the target processing cores. However, the broadcast TLBI mechanism also suffers from several limitations and drawbacks that make it suboptimal or impractical to use in certain scenarios. For example, this mechanism does not allow the initiator processing core to select specific processing cores as shootdown targets; instead, the broadcast TLBI message is automatically sent to all other processing cores in the same inner shareability domain as the initiator core. This means that, in cases where a TLB shootdown is triggered by stale PTEs that are shared by a relatively small subset of the processing cores (and thus only requires TLB flushes at that particular subset), the TLBs of all processing cores will nevertheless be flushed. This unnecessarily increases the TLB miss rate across all processing cores, which can potentially negate the performance gains achieved by using broadcast TLBI over IPI (and in some cases, can lead to worse overall performance).

Further, some platform implementations of the 64-bit ARM CPU architecture have known errata (i.e., bugs) that prevent the broadcast TLBI instruction from working as intended. Thus, SMP systems that include chips based on such platforms cannot use the broadcast TLBI mechanism at all and must always use IPIs for performing TLB shootdowns.

Yet further, in certain TLB shootdown scenarios, there is a need to implement an instruction barrier (ISB) at one or more target processing cores that prevents those target cores from proceeding with code execution until after its local TLB has been flushed. For example, the stale PTEs to be flushed may point to executable kernel code that should not be executed until after the flush operation is complete (to ensure that the correct code is run). In these scenarios, it is preferable to use the IPI mechanism over the broadcast TLBI mechanism because the IPI mechanism guarantees that each target processing core will complete its local TLB flush before continuing with executing other code, per the design/operation of the shootdown handler.

Figure 4:
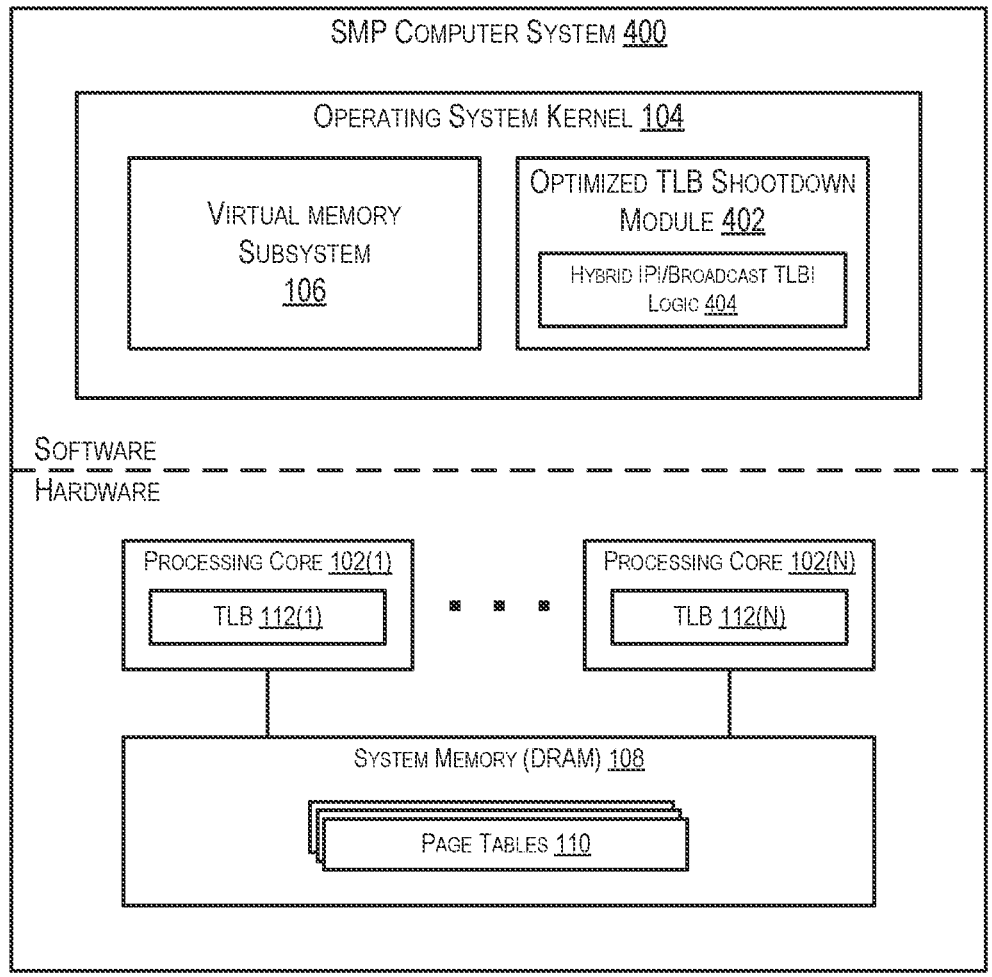
FIG. 4 depicts a computer system that implements the hybrid scheme of the present disclosure according to certain embodiments.

To address the deficiencies of both the IPI and broadcast TLBI mechanisms, FIG. 4 depicts an enhanced version of computer system 100 (i.e., computer system 400) that includes an optimized TLB shootdown module 402 in OS kernel 104 with a hybrid IPI/broadcast TLBI logic component 404. This figure assumes that computer system 400 supports both the IPI mechanism and the broadcast TLBI mechanism for TLB shootdowns. For example, computer system 400 may be a 64-bit ARM-based system.

As detailed in section (2) below, logic component 404 enables OS kernel 104 to dynamically determine, at the time a TLB shootdown is triggered with respect to one or more target processing cores, whether to use the IPI or broadcast TLBI mechanism for performing the TLB shootdown based on various factors, with the goal of ensuring that the shootdown is performed in a correct and performance-optimal manner. The factors taken into consideration can include, e.g., whether the CPU platform of system 100 has any errata that would prevent use of the broadcast TLBI mechanism, the number of target processing cores compared to the total number of processing cores (i.e., N), whether an ISB is needed at the target processing cores, and so on. In this way, OS kernel 104 can advantageously leverage the strengths, while minimizing the weaknesses, of both mechanisms.

It should be appreciated that FIGS. 1-4 are illustrative and not intended to limit embodiments of the present disclosure. For example, although FIGS. 1 and 4 depict a particular arrangement of components within computer systems 100 and 400, other arrangements are possible (e.g., the functionality attributed to one component may be split into multiple components, components may be combined, etc.). In addition, each component may include sub-components or implement functionality that is not specifically described. One of ordinary skill in the art will recognize other variations, modifications, and alternatives.

2. Hybrid Scheme Workflow

Figure 5:
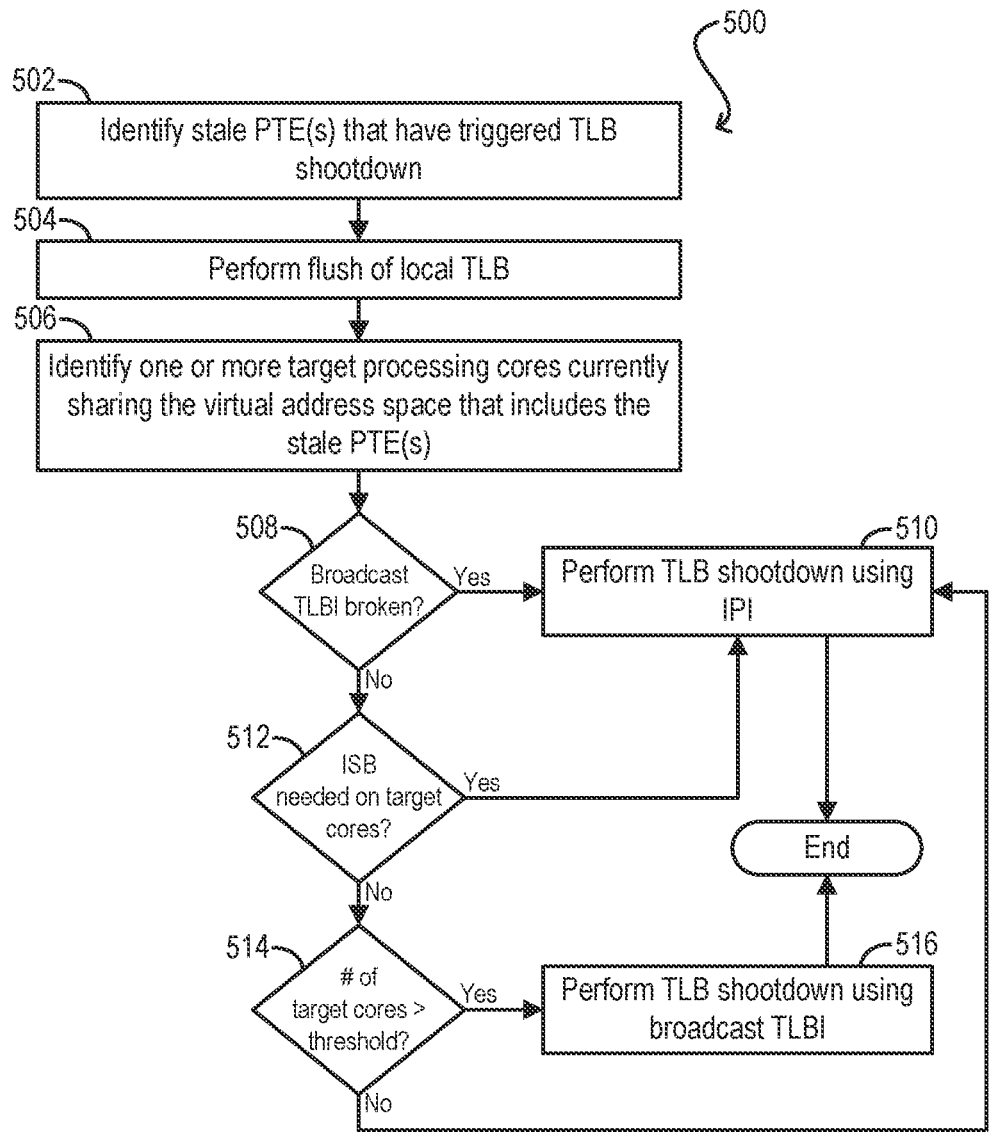
FIG. 5 depicts a hybrid scheme workflow according to certain embodiments.

FIG. 5 depicts a workflow 500 that may be executed by an OS kernel process (i.e., initiator core process) running on an initiator processing core of computer system 100 for implementing hybrid IPI/broadcast TLBI shootdown processing per logic component 404 of FIG. 4 in accordance with certain embodiments.

Starting with steps 502 and 504, the initiator core process can identify one or more stale PTEs that have triggered a TLB shootdown and can perform a TLB flush to remove those stale PTEs from the TLB of the initiator processing core.

At step 506, the initiator core process can identify one or more target processing cores that are currently sharing (i.e., accessing) the virtual address space of the stale PTEs identified at step 502. The initiator core process can then conduct a series of checks to determine whether to use the IPI mechanism or the broadcast TLBI mechanism to carry out the TLB shootdown of those target processing cores.

For example, at step 508, the initiator core process can check whether a "broadcast_TLBI_broken" variable indicates that there are any known errata for the CPU architecture and/or platform of computer system 400 stating that broadcast TLBI functionality is broken/inoperable. If the answer is yes, the initiator core process can perform the TLB shootdown using the IPI mechanism as shown in FIG. 2 (step 510) and the workflow can end.

In one set of embodiments, the OS kernel may set this variable upon system boot up/initialization by retrieving a CPU or system-on-a-chip (SoC) identifier associated with the system's processing cores and cross-checking that CPU/SoC identifier against an errata database that is keyed by such identifiers. For example, upon finding that the CPU/SoC identifier is mapped to an erratum in the database indicating that broadcast TLBI functionality is broken, the OS kernel can set the variable to true or some other appropriate value (e.g., "yes," 1, etc.). Conversely, upon finding that the CPU/SoC identifier is not mapped to any erratum indicating that broadcast TLBI functionality is broken, the OS kernel can set the variable to false or some other appropriate value (e.g., "no," 0, etc.).

Further, at step 512, the initiator core process can check whether an instruction barrier (ISB) is needed on one or more of the target processing cores. As mentioned previously, this means that those target processing cores should not be allowed to continue running code until their respective TLBs have been flushed. If the answer is yes, the initiator core process can perform the TLB shootdown using the IPI mechanism (step 510) and the workflow can end. The IPI mechanism is used in this scenario because it guarantees ISB-like synchronization at each target processing core (whereas the broadcast TLBI mechanism does not).

Yet further, at step 514, the initiator core process can check whether the number of target processing cores for the TLB shootdown exceeds a threshold. If the answer is yes, the initiator core process can perform the TLB shootdown using the broadcast TLBI mechanism as shown in FIG. 3 (step 516) and the workflow can end. The rationale behind these two steps is that it is preferable to use the broadcast TLBI mechanism if all, or most, the system's processing cores are targets of the shootdown operation because (1) the performance impact of the IPI mechanism is avoided, and (2) all/most of the processing cores are affected (which means there is no or little disadvantage to broadcasting the TLBI message to all cores). On the other hand, it is preferable to use the IPI mechanism if a relatively small number of the system's processing cores are targets of the shootdown operation because, in those scenarios, the performance impact of unnecessarily flushing the TLBs of unaffected cores will outweigh the performance gain of using broadcast TLBI over IPI. Accordingly, the broadcast TLBI mechanism is used only if the number of target processing cores exceeds a certain threshold number between 0 and the total number of processing cores (i.e., N) minus 1 where the performance benefits of the broadcast TLBI mechanism outweigh its disadvantages.

In one set of embodiments, the threshold can be based on empirical findings for computer system 400 that indicate, for this particular system configuration, what an appropriate threshold value should be. In another set of embodiments, the threshold can be based on a formula that takes into account the total number of processing cores N (e.g., N/2, N−1, etc.).

Finally, if none of the prior conditions are met, the initiator core process can default to using the IPI mechanism (step 510) and the workflow can end.

3. Extensions 3.1 Supporting TLB Flush Counting

Some OS kernels maintain a TLB flush counter for each processing core and increment this counter in the shootdown handler of a target processing core whenever that target core's TLB is fully flushed via the IPI mechanism. Among other things, this enables efficient reuse of shared virtual address space allocations.

For these OS kernels, at the time of performing a TLB shootdown using the broadcast TLBI mechanism, the initiator core process can take the additional step of incrementing the TLB flush counter for each target processing core (if performing a global flush). This ensures that the TLB flush counters remain up to date, despite the fact that no shootdown handlers are run at the target cores with the broadcast TLBI mechanism.

3.2 Supporting Processing Cores in Different Inner Shareability Domains

In some 64-bit ARM-based SMP systems, the system's processing cores may be grouped into different clusters, where each cluster is part of a different inner shareability domain. Generally speaking, an inner shareability domain defines a shared memory scope for processing cores within that domain.

As mentioned previously, the broadcast TLBI mechanism only applies to processing cores within a single inner shareability domain, such that a broadcast TLBI message sent by a processing core in a domain D1 will only be received by other processing cores in D1 (and not by processing cores in other inner shareability domains D2, D3, etc.). This is problematic for hybrid scheme workflow 500 of FIG. 5 if the processing cores of computer system 400 are spread across multiple inner shareability domains, because the broadcast TLBI mechanism will not deliver the TLBI message to all processing cores.

To address this, at the time of determining that the broadcast TLBI mechanism should be used, the initiator core process of workflow 500 can send a IPI to a processing core in each inner shareability domain different from the initiator core's domain (in addition to sending a broadcast TLBI message to other cores in the initiator core's domain). For example, assume initiator core C1 is in inner shareability domain D1 and the system further includes cores C2 and C3 in inner shareability domain D2 and cores C3, C4, and C5 in inner shareability domain D3. In this scenario, the initiator core process can send an IPI to, e.g., C2 in D2 and C4 in D3.

Upon receiving the IPI, the shootdown handler in each per-domain processing core can use the broadcast TLBI mechanism to send a broadcast TLBI message to every other processing core in the same domain. Thus, in the example above core C2 can send a broadcast TLBI message to core C3 and core C4 can send a broadcast TLBI message to cores C3 and C5. In this way, the TLB shootdown can be efficiently propagated to all processing cores in the system, despite the fact that broadcast TLBI messages are limited to a single inner shareability domain.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   determining, by an operating system (OS) kernel process running on a first processing core of a computer system, that a translation lookaside buffer (TLB) shootdown should be performed with respect to one or more second processing cores of the computer system;
   flushing, by the OS kernel process, one or more page table entries (PTEs) from a TLB of the first processing core;
   determining, by the OS kernel process, whether the TLB shootdown should be performed using an inter-processor interrupt (IPI) mechanism or a broadcast TLB invalidate (TLBI) mechanism;
   sending, by the OS kernel process, TLB flush information to a shared system memory, the TLB flush information comprising a virtual address; and
   performing, by the OS kernel process, the TLB shootdown using the determined mechanism;
   wherein the one or more second processing cores read the TLB flush information from system memory and flush the corresponding stale PTEs.

2. The method of claim 1 wherein determining whether the TLB shootdown should be performed using the IPI mechanism or the broadcast TLBI mechanism comprises checking a variable indicating whether the broadcast TLBI mechanism is broken on the computer system, and
   wherein the TLB shootdown is performed using the IPI mechanism if the variable indicates that the broadcast TLBI mechanism is broken.

3. The method of claim 2 wherein the variable is set by an OS kernel of the computer system by:
   retrieving a central processing unit (CPU) or platform identifier associated with the first and second processing cores; and
   determining whether the CPU or platform identifier is mapped to an erratum indicating that the broadcast TLBI mechanism is broken.

4. The method of claim 1 wherein determining whether the TLB shootdown should be performed using the IPI mechanism or the broadcast TLBI mechanism comprises checking whether an instruction barrier is needed at the one or more second processing cores, and
   wherein the TLB shootdown is performed using the IPI mechanism if the instruction barrier is needed.

5. The method of claim 1 wherein determining whether the TLB shootdown should be performed using the IPI mechanism or the broadcast TLBI mechanism comprises checking whether a total count of the one or more second processing cores exceeds a threshold, and
   wherein the TLB shootdown is performed using the broadcast TLBI mechanism if the total count exceeds the threshold.

6. The method of claim 5 wherein the threshold is based on empirical evidence indicating performance tradeoffs when using the IPI mechanism and the broadcast TLBI mechanism on the computer system for different numbers of target processing cores.

7. The method of claim 1 wherein the computer system is a 64-bit ARM-based system.

8. A computer system comprising:
   a plurality of processing cores, each including a translation lookaside buffer (TLB); and
   a non-transitory computer readable medium having stored thereon program code for an operating system (OS) kernel process that, when executed by a first processing core in the plurality of processing cores, causes the first processing core to:
      determine that a TLB shootdown should be performed with respect to one or more second processing cores in the plurality of processing cores;
      flush, by the OS kernel process, one or more page table entries (PTEs) from a TLB of the first processing core;
      determine whether the TLB shootdown should be performed using an inter-processor interrupt (IPI) mechanism or a broadcast TLB invalidate (TLBI) mechanism;
      send, by the OS kernel process, TLB flush information to a shared system memory, the TLB flush information comprising a virtual address; and
      perform the TLB shootdown using the determined mechanism;
   wherein the one or more second processing cores read the TLB flush information from system memory and flush the corresponding stale PTEs.

9. The computer system of claim 8 wherein determining whether the TLB shootdown should be performed using the IPI mechanism or the broadcast TLBI mechanism comprises checking a variable indicating whether the broadcast TLBI mechanism is broken on the computer system, and
   wherein the TLB shootdown is performed using the IPI mechanism if the variable indicates that the broadcast TLBI mechanism is broken.

10. The computer system of claim 9 wherein the variable is set by an OS kernel of the computer system by:
    retrieving a central processing unit (CPU) or platform identifier associated with the first and second processing cores; and
    determining whether the CPU or platform identifier is mapped to an erratum indicating that the broadcast TLBI mechanism is broken.

11. The computer system of claim 8 wherein determining whether the TLB shootdown should be performed using the IPI mechanism or the broadcast TLBI mechanism comprises checking whether an instruction barrier is needed at the one or more second processing cores, and
    wherein the TLB shootdown is performed using the IPI mechanism if the instruction barrier is needed.

12. The computer system of claim 8 wherein determining whether the TLB shootdown should be performed using the IPI mechanism or the broadcast TLBI mechanism comprises checking whether a total count of the one or more second processing cores exceeds a threshold, and
    wherein the TLB shootdown is performed using the broadcast TLBI mechanism if the total count exceeds the threshold.

13. The computer system of claim 12 wherein the threshold is based on empirical evidence indicating performance tradeoffs when using the IPI mechanism and the broadcast TLBI mechanism on the computer system for different numbers of target processing cores.

14. The computer system of claim 8 wherein the plurality of processing cores implement a 64-bit ARM architecture.

15. A non-transitory computer readable storage medium having stored thereon instructions executable by an operating system (OS) kernel process running on a first processing core of a computer system, the instructions embodying a method comprising:
- determining that a translation lookaside buffer (TLB) shootdown should be performed with respect to one or more second processing cores of the computer system;
- flushing, by the OS kernel process, one or more page table entries (PTEs) from a TLB of the first processing core;
- determining whether the TLB shootdown should be performed using an inter-processor interrupt (IPI) mechanism or a broadcast TLB invalidate (TLBI) mechanism;
- sending, by the OS kernel process, TLB flush information to a shared system memory, the TLB flush information comprising a virtual address; and
- performing the TLB shootdown using the determined mechanism;
- wherein the one or more second processing cores read the TLB flush information from system memory and flush the corresponding stale PTEs.

16. The non-transitory computer readable storage medium of claim 15 wherein determining whether the TLB shootdown should be performed using the IPI mechanism or the broadcast TLBI mechanism comprises checking a variable indicating whether the broadcast TLBI mechanism is broken on the computer system, and
- wherein the TLB shootdown is performed using the IPI mechanism if the variable indicates that the broadcast TLBI mechanism is broken.

17. The non-transitory computer readable storage medium of claim 16 wherein the variable is set by an OS kernel of the computer system by:
- retrieving a central processing unit (CPU) or platform identifier associated with the first and second processing cores; and
- determining whether the CPU or platform identifier is mapped to an erratum indicating that the broadcast TLBI mechanism is broken.

18. The non-transitory computer readable storage medium of claim 15 wherein determining whether the TLB shootdown should be performed using the IPI mechanism or the broadcast TLBI mechanism comprises checking whether an instruction barrier is needed at the one or more second processing cores, and
- wherein the TLB shootdown is performed using the IPI mechanism if the instruction barrier is needed.

19. The non-transitory computer readable storage medium of claim 15 wherein determining whether the TLB shootdown should be performed using the IPI mechanism or the broadcast TLBI mechanism comprises checking whether a total count of the one or more second processing cores exceeds a threshold, and
- wherein the TLB shootdown is performed using the broadcast TLBI mechanism if the total count exceeds the threshold.

20. The non-transitory computer readable storage medium of claim 19 wherein the threshold is based on empirical evidence indicating performance tradeoffs when using the IPI mechanism and the broadcast TLBI mechanism on the computer system for different numbers of target processing cores.

21. The non-transitory computer readable storage medium of claim 15 wherein the computer system is a 64-bit ARM-based system.

* * * * *